Dec. 18, 1951   C. L. BROWNLOW   2,578,877
SEISMOGRAPH BLASTER TIME BREAKER CIRCUIT
Filed May 16, 1946
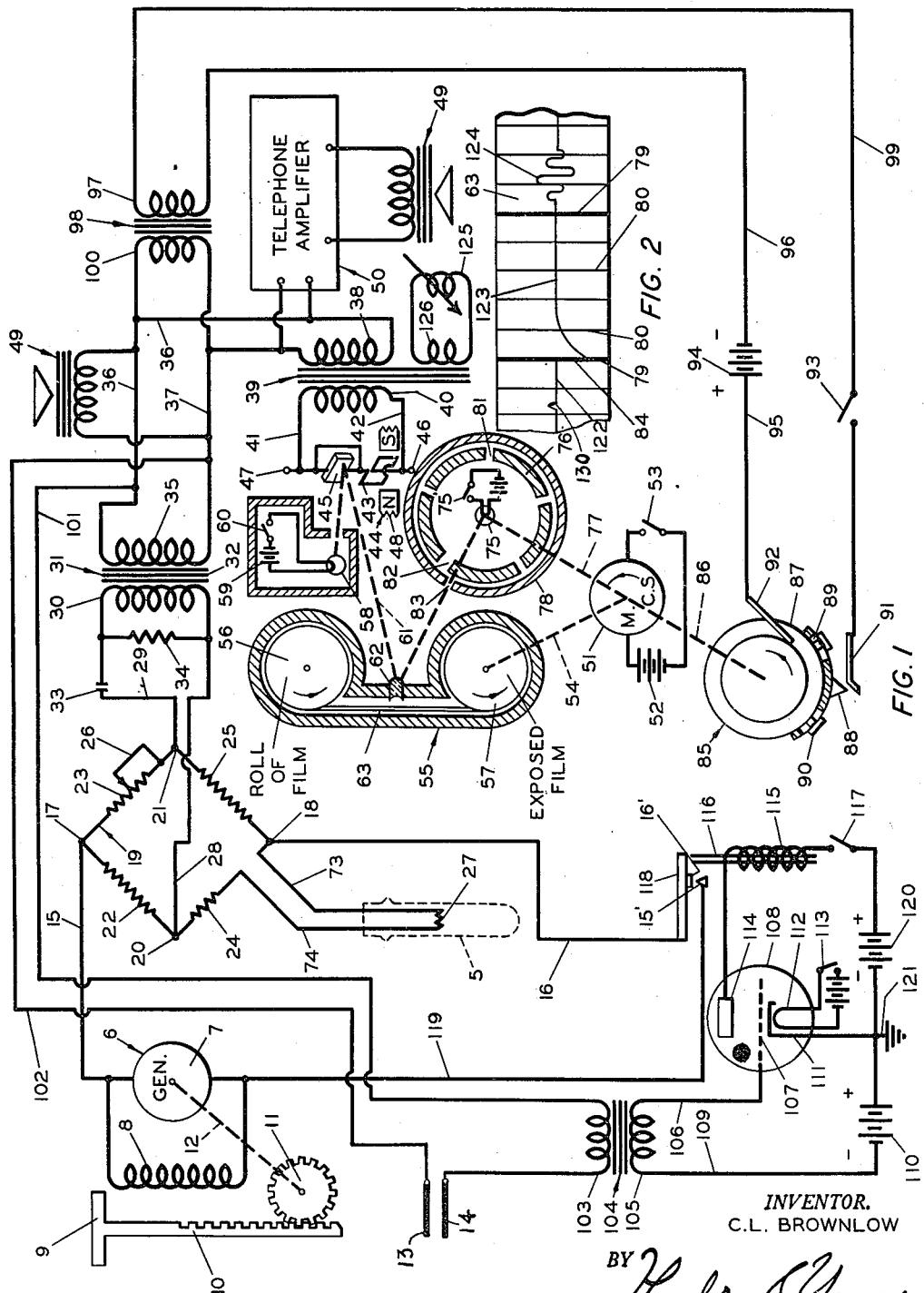
INVENTOR.
C.L. BROWNLOW
BY
Hudson Young
ATTORNEYS

UNITED STATES PATENT OFFICE 2,578,877

SEISMOGRAPH BLASTER TIME BREAKER CIRCUIT

Cecil L. Brownlow, Bartlesville, Okla., assignor to Phillips Petroleum Company, a corporation of Delaware Application May 16, 1946, Serial No. 670,267

9 Claims. (Cl. 346—33)

This invention relates to electrical impulse generators. In a more specific aspect it relates to generators of time break impulses for recording on seismograph records. In another specific aspect it relates to means for forming such time break impulses so that they make an easily measured record.

In the art of seismic prospecting it is common to detonate a blasting charge and record the instant at which the charge was detonated (known as the time break) by means of a galvanometer. The same galvanometer and all the other galvanometers then record the seismic waves coming through the earth from the explosion on the same uniformly moving photographic film on which is recorded the time break of the blast. Knowing the speed of the film, measurements can be made on the film between the time break impulse and the record of the arrival of the seismic waves through the earth, whereby the time of travel of the waves is determined. To aid these measurements spaced lines are placed on the photographic film. While these lines could be preformed on the film, slight variations in the speed, especially when one roll is full of film, make it preferable to record these spaced lines on the film at the same time the waves are being recorded.

From these records geologists may theorize on the structure of the ground and such theorizing has become an accurate science so that oil formations and other valuable structures which are invisible from the surface may be readily located.

As the measurements made all start with the time break impulses as the zero point it is important that a good clear time break impulse be recorded from which measurements can accurately and easily be made.

A preferred apparatus for making such a clear time break impulse is disclosed in U. S. patent application, Serial No. 628 310, now Patent Number 2,470,846, May 24, 1949, filed November 13, 1945, for "Seismograph Blaster Time Breaker Circuit" by Deslonde R. deBoisblanc and John E. Bondurant and is incorporated in the embodiment of the invention shown in the present drawings. The present invention, however, can also be used with other time break impulse generators as will be explained in detail later.

In the present invention I have found it valuable to place the time break record substantially exactly on one of the spaced measurement lines, and when every fifth line (or every "nth" line ) is heavier than the intermediate lines it is preferable to place the time break substantially on the heavy line. This simplifies calculations to a great degree, but what is probably more important is that the number of mistakes and careless errors are greatly reduced automatically. Such errors in arithmetic can cause the geologist to go astray in his theory interpreting the formation, resulting ultimately in financial loss in drilling or leasing land.

The principal object of the present invention is to place any time break impulse record near to a line or other predetermined point on any type record used for recording voltage or current variations with respect to time.

Another object is to provide a blasting circuit connected with a time break recording circuit in which the time break impulse will be recorded in a predetermined locus.

Another object is to provide relatively light weight, simple and rugged electrical circuit equipment for the production of time break impulses and recording them where desired on a record strip.

Numerous other objects and advantages will be apparent to those skilled in the art upon reading the accompanying specifications, claims and drawings.

In the drawings

Figure 1 is a schematic and electrical diagram of a circuit embodying the present invention.

Figure 2 is a sketch showing the shape of a time break when placed exactly on a heavy line of the record.

In Figure 1, the outline 5 of the blasting cap is shown. This blasting cap may be of any known electrical type, but in order to obtain the best results it is advisable to use a blasting cap especially made for seismograph service such as a Du Pont E-65 "SSS" seismograph blasting cap. Such a cap when a current of approximately 5 amperes is applied will fire in less than 0.0004 of a second. However the present invention is valuable regardless of how special or ordinary blasting cap 5 may be.

Cap 5 is fired by a source of current such as a blasting machine generally designated as 6.

Other sources of current may be employed in place of 6 such as a battery, as will be explained later.

For best results it is preferred to use a direct current generating magneto type blasting machine 6 which is well known to the art. The magneto rotor 7 rotates in the field 8 and is generally hand driven, although it could be driven by motor. Several types of hand drivers are employed but for purposes of illustration the pump type is shown having a pump handle 9 with a rack 10 which rack on the down stroke engages and rotates gearing 11 which rotates rotor 7 through some type of shaft as 12. At the bottom of the stroke of pump handle 9 the handle closes a firing switch made up of contacts 13 and 14. Obviously the details of the direct current generator at point 6 do not effect the operation of the present invention which can use any type direct current source at 6.

When switch 13, 14 closes, current generated by 6 is applied through wires 15 and 16 (provided that switch 15', 16' is also closed) to opposite points 17 and 18 of a bridge generally designated as 19. The bridge 19 consists of 4 points 17, 18, 20 and 21 connected as shown by resistances 22, 23, 24 and 25. Resistance 23 may be varied by variable shorting slider 26 or any other suitable means for varying resistance. Resistance 24 represents the resistance of several elements such as a fixed resistor, and the resistance of wires 73 and 74 but for purposes of clarity resistance 27 is shown separately as representing the resistance of the heating element in the blasting cap 5. The means for closing switch 15', 16' will be described later on, and the conditions for its closure given.

Connected from points 20 and 21 by wires 28 and 29 is the primary coil 30 of a transformer generally designated as 31. This transformer may or may not have an iron core 32 but better results are obtained with iron core 32.

A direct current is generated at 6, and in order to only record a pulse thereof it has been found advantageous to insert a condenser 33 in one of wires 28 or 29 and to bridge the primary 30 with a high resistance 34 in order to obtain the best results. However valuable results can still be obtained even if 33 and 34 are omitted and wires 28 and 29 are unbroken and unconnected except through bridge 19 and coil 30.

Transformer 31 has a secondary coil 35 which is connected by transmission line consisting of wires 36 and 37 to a primary coil 38 of a second transformer generally designated as 39. Transformer 39 has a secondary coil 40 which is connected by wires 41 and 42 to the coil 43 of a galvanometer generally designated as 44. Only one turn of coil 43 is shown for purpose of clarity. Coil 43 is rigidly connected to a mirror 45 and the mirror and galvanometer are suspended by pivots 46 and 47 for rotation in the field of permanent magnet 48 having north and south poles (N) and (S).

Obviously wires 28 and 29 could be connected directly to wires 41 and 42 if galvanometer 44 was made rugged enough. Obviously it is preferable to employ transformers 31 and 39 to obtain a proper current for galvanometer 44.

While a particular electrical circuit has been shown it is believed obvious that it may be modified in many ways without departing from the invention. For example if wires 36 and 37 run from the blasting point near generator 6 to the recording point near galvanometer 44 which points are often separated by a considerable distance it is convenient to use wires 36 and 37 for other purposes at the same time they form a part of the present invention. For example a telephone circuit consisting of a combination transmitter and receiver 49 may be installed on wires 36 and 37 with the usual telephone equipment generally designated as 50.

In Figure 1, parts 5 and 27 are down in a blasting hole (not shown) and parts 6 to 26 and 28 to 35 are ordinarily located at a point adjacent to the blasting hole while recording parts 38 to 48 may be a considerable distance away. The telephone instruments may be located wherever desired, ordinarily one near the blasting equipment and one near the recording equipment. The telephone equipment 50 is ordinarily placed near the recording equipment. The recording equipment which consists of all numbers over 38 and below 73 (except for 49 and 50) is generally located at a point distant from the blasting equipment. This location of parts may be varied but obviously nothing should normally be in the blast hole but 5, 27, 73 and 74. If the other parts are all close, telephones 49 and 50 may be removed. The location of parts therefore is a matter of convenience and does not change the invention. Obviously the man who operates pump handle 9 should be able to see the blast hole so he won't blow up somebody who might be dangerously near, but even that doesn't change the invention.

While many types of recording exist which can cooperate with mirror 45 of galvanometer 44 in order to present the present invention clearly a simplified form of such equipment has been shown to make the invention simpler. For example a constant speed motor 51 may be driven by any power source such as battery 52 when desired by closing switch 53. Motor 51 through shaft 54 drives a camera generally designated as 55 so that unexposed film on roll 56 is unrolled and rolled on roll 57 as indicated by arrows. A light source illustrated by incandescent bulb 58 is shown as powered by battery 59 and switch 60 and throws a ray of light 61 on to mirror 45 from which it is reflected to transparent lens 62 and concentrated on the film 63 lying behind 62 and traveling at a uniform speed from 56 to 57.

Actually the structure shown is quite a simplification as there may be as many as 12 galvanometers reflecting light from lamp 58 on to film 63. All the other galvanometers (not shown) and galvanometer 44 are also electrically connected to geophones (not shown) which geophones generate electrical currents when the earth that they are placed on, or in, vibrates with tremors from the blast set off by a blasting cap 5 which currents rotate the coils of the galvanometers and the mirrors recording the tremors on film 63 at a time later than the time break impulses.

While the film 63 might be already provided with time lines and the present invention be employed by relying on the relation of the time lines to the film roll 57, shaft 54 and constant speed motor 51, this obviously would be an inferior arrangement to the preferred embodiment shown which has a second source of light 75 which is interrupted by a slotted drum 76 rotating at a very constant speed by means of shaft 77 and gearing if desired (which is not shown) driven by motor 51 or a similar motor which with stationary screen 78 acts to record time interval marking lines on film 63 through lens 62 at the same time that the galvanometers are recording their respective traces on film 63. These time lines (see Figure 2 showing developed film 63) may consist of a heavy line 79 every 0.1 of a second and four 0.02 second lines 80 in between the heavy lines. Other combinations of heavy and light lines may be employed, the drum 76 being provided with a thin slot 81 for each light line and a wide slot 82 for each heavy line desired and stationary screen 78 having a stationary slot 83 to direct the light to lens 62.

In order to make the measurement of time intervals as simple as possible it is desirable to have the time break (which is the time of explosion of cap 5) recorded as near to a heavy line 79 as possible, preferably directly on the line. In determining distances this heavy line may be designated as zero and the other heavy lines are obviously even tenths of a second from it. Which heavy line receives the time break is immaterial and generator 6 will supply sufficient current over an interval greater than 0.1 second to set off cap 5 at the time the next heavy line is being recorded, after the switch 13, 14 is closed.

The time break 84 (Figure 2) is the record of an electrical impulse sent through the system of Figure 1 by the explosion of cap 5 and the breaking of the circuit by the burning out of ignition wire 27 in cap 5 which occurs about 0.0004 second after current from generator 6 is applied to wires 73 and 74. It will be understood that the sketch shown by Figure 2 is merely intended to give an indication of the results to be obtained by the circuits and apparatus of the present invention. In an actual geophone recording, relative minor variations occur along the portion 123 of the curve while the amplitude of time break 84 and pressure waves 124 is considerably greater than shown. However, to show these variations in their proper scale would require an extremely large scale to be utilized and the simplified wave shown by Figure 2 adequately illustrates the purpose and function of the present invention.

In order to place the time break 84 on a heavy line 79 an electrical switching circuit is provided.

A rotating switch generally designated as 85 is driven in timed relation with drum 76 by any suitable means, such as shafts 77 and 86. Rotating switch 85 has an electrically conducting body 87 to which a contact 88 is adjustably secured by slots 89 and screws 90. By adjusting screws 90 the position of contact 88 may be varied around the circumference of body 87. A flexible contact arm 91 is provided in a stationary position to contact the revolving contact 88 once in every revolution, while a constant contact brush 92 is always in contact with 87. Switch 93 is closed and battery 94 provides the current in wires 95 and 96.

The circuit of wires 95 and 96 includes the coil 97 of transformer 98 and wire 99. Each time contact 88 touches contact 91 a pulse of direct current passes through coil 97 inducing a similar pulse of current in coil 100. This impulse travels along wires 36 and 37 and then along wires 101 and 102 to create a similar impulse in coil 103 of transformer 104 provided switch 13, 14 is closed. When switch 13, 14 is open no impulse is created in coil 103.

When an impulse is created in coil 103 of transformer 104 a like impulse is created in coil 105 which is connected by wire 106 to the grid 107 of triode 108 and by wire 109 through battery 110 to the cathode 111 of said triode.

Cathode 111 is heated by the usual heater 112 upon closing switch 113. The plate 114 of triode 108 is connected to solenoid 115 which solenoid preferably has an iron armature 116 therein, switch 117 being closed for such connection. Armature 116 is close enough to attract the iron switch element 16' when there is sufficient current in coil 115. At other times spring 118 retracts 16' from armature 116 and disconnects from contact point 15'. When 16' is attracted to 118, contact 15' contacts 118 and allows flow of current in wires 16 and 119, which current is supplied by generator 6 and is then applied to points 17 and 18 of bridge 19. A battery 120 is provided between switch 117 and cathode 111, as shown, and a ground is provided at point 121.

In Figure 2, is shown a section of the film 63 after it is developed, and when there is insufficient current in coil 40 the galvanometer mirror makes a straight line 122 on the record. Lines 79 and 80 are also being recorded on the record. At the time of the break 84 a sudden pulse of current pulls line 122 down abruptly, preferably as the time line 79 is being recorded. The galvanometer 44 soon returns to normal and traces line 123 on the film until the signal 124 is received from the geophone or other detecting device 125 and then signal 124 is traced on the film.

In Figure 1, the variable inductance 125 represents the geophone pick-up and all the usual amplifiers and other equipment used in preparing geophone currents for recording. The recording is accomplished by coupling coil 126 through the iron core 39 to coil 40, which coil 40 is preferably connected by wires 41 and 42 to the coil 43 of galvanometer 44. When the geophone system 125 receives a seismic wave, or a sound wave, or whatever other type phenomena the system was designed to record, current in coil 126 generates a similar current in coil 40 which actuates galvanometer coil 43, and then mirror 45 records the phenomenon at 124. The distance between 84 and any desired point of 124 is easily measured by taking the line 79 on which 84 is disposed as zero and counting the heavy lines in between as 0.1 seconds each and then counting the remainder with lines 80 as 0.02 seconds each and estimating 0.001 or measuring the same.

The present invention is adapted to operate with any type of blasting machine and/or blasting circuit. For example, in Figure 1, suppose condenser 33 were shorted by extending wire 29 right on across it and suppose resistances 22, 25 and 34 were made infinite, such as by being removed from the circuit, and further that resistances 23 and 24 were made substantially zero, then a very simple means of firing cap 5 would be provided and the present invention would apply just as well to this simple means as to the preferred embodiment shown in the drawing. The shape of the time break 84 would be entirely different from the vertical line shown in Figure 2, but by adjusting screw 90 and contact 88, any portion of that differently shaped time break would be placed on line 79. Obviously the type of time break shown at 84 in Figure 2 is preferable and therefore, I have shown my invention applied to a device containing a bridge 19 capable of producing such a vertical time break, however, it should be understood that the present invention may be applied to any seismograph blasting circuit or other similar circuit regardless of the shape of the time break, and whether any apparatus is provided for charging or controlling the shape of the time break.

*Operation*

Assuming switches 60, 75', 53, 93, 113 and 117 to be closed and switch 13, 14 and 15', 16' to be open, motor 51 running, tube 108 non-conducting and contact 88 to be out of contact with 91, the operation then is as follows:

The handle 9 of blasting machine 6 is rapidly shoved downward and generator 6 creates an electrical potential between points 15' and 16' and rod 10 closes switches 13, 14.

Motor 51 being running is rotating drum 76 and film roll 57 so that photographic film 63 is moving downwardly in camera 55 and time lines 80 are being recorded on 63 by light 75. A steady line 122 is being recorded on film 63 from light 58 and mirror 45.

Contact 88 now touches contact 91 just in sufficient time ahead of the recording of heavy lines 79 by means of slot 82 to allow for the operation of the device and the arrival of a time break impulse at galvanometer 44 so that time break 84 will be recorded on line 79 as in Figure 2. By adjusting at 90 this condition may be achieved. The closure of contacts 88, 91 produces a pulse which appears across the transformer 39 and causes an indication to be made upon the film before the time break 84 occurs. This pulse of current is illustrated at 130 in Figure 2.

As contact 88 contacts 91, battery 94 sends an impulse through wires 96 and 99, coil 97, coil 100, wires 36 and 37, wires 100 and 102 (switch 13, 14 having been closed by rod 10) and creates impulses in coil 103 which creates a like impulse in coil 105 which overcomes the bias of battery 110 causing grid 107 to go less negative momentarily.

When grid 107 goes less negative gas triode 108 becomes conducting and a current flows from plate 114 to cathode 111 energizing solenoid 115 and closing switch 15', 16' so that 15' is in contact with 118.

The current generated by generator 6 (the armature 7 of which may be provided with an over-running clutch so that it may continue to rotate after shaft 12 has stopped) is applied through wires 15 and 119 to points 17 and 18 of bridge 19.

For illustrative purposes let resistance 22 be 10 ohms, 23 be 500 ohms, 24 be 10 ohms, 25 be 500 ohms and 27 be from 4 to 5 ohms depending on the length of the lead wires 73 and 74; which lead wires have a low resistance of about 1 ohm per 100 feet. With such a set up and using a Du Pont #30 cap blaster at 6 condenser 33 may be about 4 mfd. and resistance 34 may be about 250 ohms.

It will be noted that resistances 23 and 25 are much higher than resistances 22 or 24 and 27. Actually resistances 23 and 25 could be the same size or even smaller than resistance 22 and 24 plus 27 but in such case most of the current from 6 flowing from point 17 to point 18 would be wasted in resistance 23 and 25 where it would not accomplish anything. But by having resistance 23 and 25 high relative to 22, 24 and 27, most of the current will pass through resistance 27 where it will perform useful work in setting off blasting cap 5 until resistance 27 is destroyed.

The important feature of bridge 19 is that the resistances are balanced so that point 20 is at the same potential as point 21 as long as resistance 27 lasts. This is achieved by having the following ratio between the resistances:

$$\frac{R_1}{R_2+R_3}=\frac{R_4}{R_5}$$

(Where $R_1$ is resistance 22, $R_2$ is 24, $R_3$ is 27, $R_4$ is 23 and $R_5$ is 25.) In the example given the values would be:

$$\frac{10}{14.5}=\frac{X}{500} \quad X=345$$

Variations in the length and therefore resistance of wires 73 and 74 may be compensated by varying resistance 23 with slider 26.

The object is to keep point 20 in the same potential as point 21 until resistance 27 is destroyed by the blast. Points 20 and 21 are always at the same potential so there is no current in primary 30. This state of firing lasts only about 0.0004 second if wire 27 sets blasting cap 5 off in that length of time.

Wire 27 is blown apart by the blast and becomes an infinite resistance which unbalances bridge 19 and a direct current pulse flows from point 20 to point 21 or vice versa loading up condenser 33 which puts a pulse into primary 30 inducing current in secondary 35 which direct current pulse is transmitted by wires 36 and 37 and applied through transformer 39 to coil 43 on galvanometer 44.

This sudden application of direct current pulse in coil 43 sets up a magnetic field opposing that of magnet 48 and causes the galvanometer mirror to jump making a substantially vertical line 84 in trace 122 as shown in Figure 2.

When cap 5 explodes it causes the instantaneous detonation of a large charge of dynamite or TNT associated therewith. The explosion of this large charge (not shown) sets up seismic waves in the ground and these waves travel out in all directions at speeds determined by the nature of the ground at the particular place, as is well understood in the prior art. When these disturbances reach a geophone they shake the geophone and the geophone generates currents. The geophone is not shown, but is represented by variable inductance 125. The geophone currents are small and are amplified before being placed on coil 126. Such amplification may be made to automatically increase as the currents generated grow weaker, but the system employed for producing currents in coil 126 is no part of the present invention as any system old in the prior art may be used in place of 125 and 126 in Figure 1 of the present invention. All the subject matter of this present paragraph is old and well understood in the prior art.

Before the time comes to fire another cap 5 the switch 117 is first opened and closed to break the plate-cathode current from battery 120 in tube 108. Battery 110 is putting negative bias on grid 107, so as soon as switch 117 breaks the current, tube 108 (which is preferably a gas filled thyratron type tube) returns to its non-conducting state as at the start of the above described "operation." Electrical means may be provided to automatically open switch 117 after switch 15', 16' has been closed long enough for cap 5 to explode (which may be before the next heavy line 79 occurs) but in order to keep the wiring as simple as possible such automatic electrical means to open switch 117 is not shown.

In some instances where substituted blasting caps, or cap firing circuits, do not record the blast substantially instantaneously because they are of inferior design to those shown, there may be a time lag. In such instances the timing segment 89 may be adjusted to place the time break ahead of a heavy line 79 by a distance such that the heavy line represents the time of the explosion and is the base line of all measurements. Obviously a time lead in the circuit would be compensated for by a reverse adjustment of 89. The object is to get one of the heavy lines 79 to represent the exact instant of the explosion, and the time break 84 merely identifies which heavy line is to be counted from as the time datum, or zero hour. The lines are counted to determine the time between the explosion at zero hour and any seismic wave record and the only measurement of distance ever made on film 63 is between the two light lines that may bracket the seismic wave record curve 124 because film 63 may shrink or expand unequally in different places on development and rolls 56 and 57 do not work perfectly, so counting is more accurate.

Any tuning fork, tuned oscillating piezoelectric crystal, or other control system (not shown) old in the art may be used to make constant speed motor 51 run to any degree of accuracy desired and motor 51 may be an alternating current motor, induction motor, or other type to fit such control system, such motors and systems being well known in the art.

While this system has been described in relation to a seismograph recording system for which it was primarily designed, it is believed obvious that the present invention may be applied to any electrical system in which it is desired to momentarily delay a current and then place the current in the system at an exact instant which instant may be one of a number of periodically occurring instances such as a certain point in the oscillation of a pendulum, or any other recurrent or harmonic physical phenomena. For example this system is useful in radio sounding of the ocean, or of the ionosphere.

While for purpose of illustration I have shown a particular circuit provided for the present invention it is obvious that numerous changes and modifications may be made without departing from the scope of the present invention which is set forth in the following claims:

Having described my invention, I claim:

1. In a seismic wave generating and recording system the combination comprising a generating station, a recording station, and a signal system for transmitting signals from one station to the other, means for moving a recording medium at said recording station, means to make indications on said medium at predetermined intervals of time, a rotatable cam member driven by said moving means, pulse generating means including a set of contacts actuated by said rotatable cam member to make a pulse in said signal system at a predetermined interval of time from the time of making one of said indications, means to generate seismic waves at the generating station comprising an explosive charge, an electric heating element disposed to set off said explosive charge and to be broken in the resulting explosion, and firing current generating means to generate sufficient electric current to heat said element enough to set off said charge connected to said element by a first electric circuit containing a first open switch, first switch closing means comprising a second electric circuit responsive to any of said pulses to close said first open switch, a third electric circuit means containing a second open switch connecting said second circuit means to said signal system for reception of said pulses only when said second open switch is closed, and means connected to said firing current generating means disposed to close said second open switch when sufficient electric current is normally being generated, whereby said charge is set off only in response to the actuation of said firing current generating means, but at a time set by one of said pulses, means for impressing a signal on said signal system actuated by an open circuit in said heating element immediately said element is broken in said explosion, means for making indications on said medium responsive to said signal to record the time of the explosion, means for detecting the arrival of seismic waves by generating electric current, and means responsive to current from said last mentioned means for actuating said indicating means to indicate the time of arrival of said seismic waves on said medium.

2. In a seismic wave generating and recording system the combination comprising a generating station, a recording station, and a signal system for transmitting signals from one station to the other, means for moving a recording medium at said recording station, means to make indications on said medium at predetermined intervals of time, a rotatable cam member driven by said moving means, pulse generating means including a set of contacts actuated by said rotatable cam member to make a pulse in said signal system at a predetermined interval of time from the time of making at least certain of said indications, means to generate seismic waves at the generating station comprising an explosive charge, an electric heating element disposed to set off said explosive charge and to be broken in the resulting explosion, and firing current generating means to generate sufficient electric current to heat said element enough to set off said charge connected to said element by a first electric circuit containing a first open switch, first switch closing means comprising a second electric circuit responsive to any of said pulses to close said first open switch, a third electric circuit means containing a second open switch connecting said second circuit means to said signal system for reception of said pulses only when said second open switch is closed, and means connected to said firing current generating means disposed to close said second open switch while said generating means is operating, whereby said charge is set off only in response to the actuation of said firing current generating means, but at a time set by one of said pulses, means for impressing a signal on said signal system actuated by an open circuit in said heating element immediately said element is broken in said explosion, and means for making an indication on said medium responsive to said signal to record the time of the explosion.

3. An explosion-time setting and recording device comprising means for moving a recording medium, means to make spaced indications at first predetermined time intervals on said medium, a cyclically movable actuating member driven by said moving means, a pulse generating means including a set of contacts controlled by said actuating member for making pulses at second predetermined time intervals from said first time intervals, an explosive charge, a blasting cap for detonating said charge, means for firing said explosive charge comprising means for generating electric current to fire said charge and connecting means for connecting said current to said blasting cap actuated by one of said pulses, said means for generating said electric current being disposed on operation to automatically connect said pulse generating means to said connecting means to actuate the same, and means responsive to the resulting explosion recording said explosion on said medium in proper time relation to said indications, said last-mentioned means including a recording galvanometer to produce a trace upon said recording medium, and a circuit comprising said generating means, said cap, and said galvanometer, and means to vary said second predetermined intervals so that only when the charge firing means operates as predicted the record of said explosion will coincide substantially with one of said indications.

4. An explosion-time setting and recording device comprising means for moving a recording medium, means to make spaced indications at first predetermined time intervals on said recording medium, pulse generating means including a contact actuator driven by said first means for making pulses at second predetermined time intervals from said first time intervals, an explosive charge, a blasting cap for detonating said charge, means for firing said explosive charge comprising means for generating electric current to fire said charge and connecting means for connecting said current to said blasting cap actuated by one of said pulses, said means for generating said electric current being disposed on operation to automatically connect said pulse generating means to said connecting means to actuate the same, and means responsive to the resulting explosion recording said explosion on said recording medium in proper time relation to said indications said last-mentioned means including a recording galvanometer to produce a trace upon said recording medium, and a circuit comprising said generating means, said cap, and said galvanometer.

5. An explosion-time setting and recording device comprising means for moving a recording medium, means for making spaced indications at predetermined intervals of time on said medium, an explosive charge, an electric firing cap in said charge, means for firing said charge by applying an electric current to said cap, means including a contact actuator driven by said first means for synchronizing the application of said electric current to said cap with said indications, and means for recording the explosion of said charge on said medium said last-mentioned means including a recording galvanometer to produce a trace upon said recording medium, and a circuit comprising said generating means, said cap, and said galvanometer.

6. In a seismic recorder, in combination, a circuit for periodically producing pulses of electric current, and means for setting off an explosive charge a predetermined interval after one of said pulses comprising an electrically actuated detonator, a generator, a firing circuit including said generator, said detonator, and a circuit closing device, firing mechanism including an operating member for mechanically actuating said generator and a switch which is actuated when said member is moved to firing position, and an actuating circuit for said circuit closing device including said pulse generating circuit and said switch, whereby the firing circuit is closed when said operating member is moved to firing position and a pulse is produced by said generating circuit, the time delay in said actuating circuit being equal to said predetermined interval.

7. In a seismic recorder, in combination, a pulse generating circuit including a current source, a transformer primary winding, and a cyclically operable set of contacts, and means for setting off an explosive charge a predetermined interval after one of the pulses produced by said circuit comprising an electrically actuated detonator, a second current source, a firing circuit including said second source, said detonator and a circuit closing device, firing mechanism including an operating member mechanically actuating said second current source and a switch which is closed upon movement of said member to firing position, and an actuating circuit for said circuit closing device including the secondary winding of said transformer and said switch whereby the firing circuit is closed when said operating member is moved to firing position and a pulse is produced by said generating circuit, the time delay in said actuating circuit being equal to said predetermined interval.

8. In a seismic recorder, in combination, a pulse generating circuit including a current source, a transformer primary winding, and a cyclically operable set of contacts, and means for setting off an explosive charge a predetermined interval after one of said pulses comprising an electrically actuated detonator, a second current source, a firing circuit including said second source, a circuit closing device, and a balanced Wheatstone bridge having said detonator in one leg thereof, firing mechanism including an operating member and a switch which is closed upon movement of said member to firing position, and an actuating circuit for said circuit closing device including the secondary winding of said transformer and said switch whereby the firing circuit is closed when said operating member is moved to firing position and a pulse is produced by said generating circuit, the time delay in said actuating circuit being equal to said predetermined interval, the firing of said detonator producing a pulse of current across said Wheatstone bridge exactly coinciding in time with said firing of the detonator.

9. In a seismic recorder, in combination, a circuit for periodically producing pulses of electric current, and means for setting off an explosive charge a predetermined interval after one of said pulses comprising a blasting cap having an electrical resistance heater for detonating a charge of explosive, firing mechanism including an operating member, a set of contacts which are closed upon movement of said member to firing position, and a source for generating electric current when said member is moved to firing position, a gas tube, a relay connected in the anode-cathode circuit of said tube, the control grid-cathode circuit of said tube being coupled to said contacts and said pulse generating circuit whereby said tube becomes conductive and a set of relay contacts is closed when said member is moved to firing position and a pulse is produced by said generating circuit, the time delay in the relay circuit being equal to said predetermined interval, and a firing circuit including said current source, said relay contacts, and the resistance heater in said blasting cap.

CECIL L. BROWNLOW.

REFERENCES CITED

The following references are of record in the file of this patent:

UNITED STATES PATENTS

| Number | Name | Date |
|---|---|---|
| 2,313,091 | Renner | Mar. 9, 1943 |
| 2,411,117 | Scherbatskoy | Nov. 12, 1946 |
| 2,420,025 | Young | May 6, 1947 |
| 2,470,846 | De Boisblanc et al. | May 24, 1949 |
| 2,490,461 | McKinney | Dec. 6, 1949 |